US012606308B2

(12) United States Patent (10) Patent No.: US 12,606,308 B2
Yang et al. (45) Date of Patent: Apr. 21, 2026

(54) DRONE WATER QUALITY DETECTION DEVICE AND DRONE WATER QUALITY DETECTION METHOD

(71) Applicant: Metal Industries Research & Development Centre, Kaohsiung (TW)

(72) Inventors: Kuang-Shine Yang, Tainan (TW); Chao Chieh Hsu, Kaohsiung (TW); Ping-Hua Su, Kaohsiung (TW); Tsung-Yi Lan, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 211 days.

(21) Appl. No.: 18/528,755

(22) Filed: Dec. 4, 2023

(65) Prior Publication Data

US 2025/0178732 A1 Jun. 5, 2025

(51) Int. Cl.
 *B64D 1/22* (2006.01)
 *B64U 10/13* (2023.01)
 *B64U 101/35* (2023.01)

(52) U.S. Cl.
 CPC ............... *B64D 1/22* (2013.01); *B64U 10/13* (2023.01); *B64U 2101/35* (2023.01); *B64U 2201/10* (2023.01); *B64U 2201/20* (2023.01)

(58) Field of Classification Search
 CPC .................................. B64D 1/22; B64U 10/13
 See application file for complete search history.

(56) References Cited

U.S. PATENT DOCUMENTS

2015/0158587 A1* 6/2015 Patrick ..................... B64D 1/22
 701/3

2017/0328814 A1* 11/2017 Castendyk .............. B64D 1/22
2024/0127701 A1* 4/2024 Swanson ................. G08G 5/56

FOREIGN PATENT DOCUMENTS

| CN | 107097954 | 8/2017 |
|----|-----------|--------|
| CN | 105752337 | 4/2018 |
| CN | 110455293 | 11/2019 |
| CN | 113588353 | 11/2021 |
| CN | 113917104 | 1/2022 |

OTHER PUBLICATIONS

"Office Action of Taiwan Counterpart Application", issued on Jul. 5, 2024, p. 1-p. 14.

* cited by examiner

*Primary Examiner* — Luke Huynh
(74) *Attorney, Agent, or Firm* — JCIPRNET

(57) ABSTRACT

A drone water quality detection device and a drone water quality detection method are provided. The drone water quality detection device includes an unmanned flight module, a reeling module, a controller and a water quality analyzer. The controller is configured to control the unmanned flight module and the reeling module. The reeling module connects to the water quality analyzer through a rope. When the drone water quality detection device flies above the water area to be measured, the controller controls the reeling module to release the water quality analyzer into the water area to be measured. The water quality analyzer detects a current pressure parameter to transmit the current pressure parameter back to the controller. The controller controls the reeling module to retract and unwind the line according to the current pressure parameter to adjust a depth of the water quality analyzer in the water area to be measured.

16 Claims, 8 Drawing Sheets

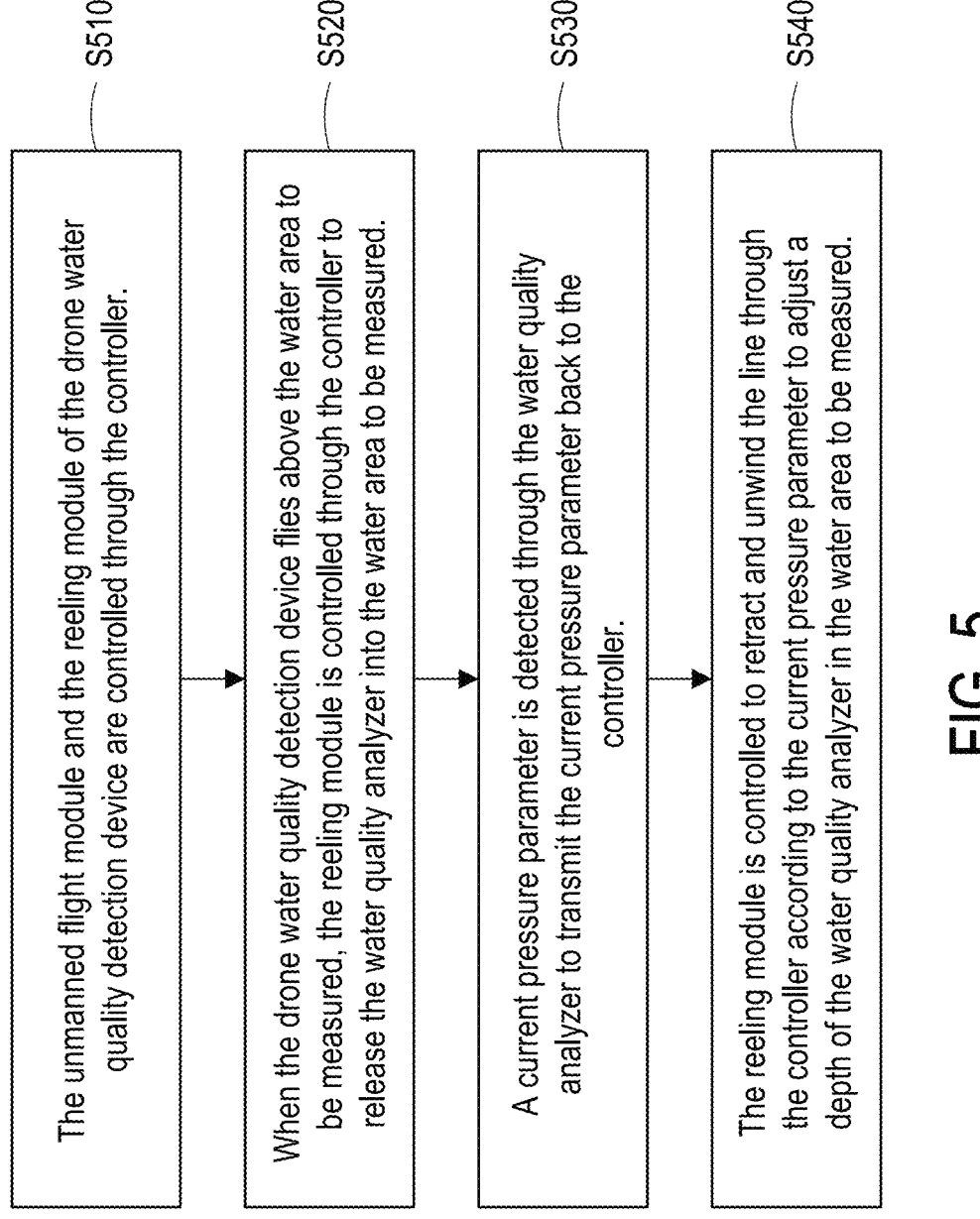

S510

The unmanned flight module and the reeling module of the drone water quality detection device are controlled through the controller.

S520

When the drone water quality detection device flies above the water area to be measured, the reeling module is controlled through the controller to release the water quality analyzer into the water area to be measured.

S530

A current pressure parameter is detected through the water quality analyzer to transmit the current pressure parameter back to the controller.

S540

The reeling module is controlled to retract and unwind the line through the controller according to the current pressure parameter to adjust a depth of the water quality analyzer in the water area to be measured.

Multiple water area image data are collected.

S720

Multiple water area image data are marked.

S730

Deep learning is performed according to multiple marked water image data, and a recognition model is trained.

S740

Recognition model is generated.

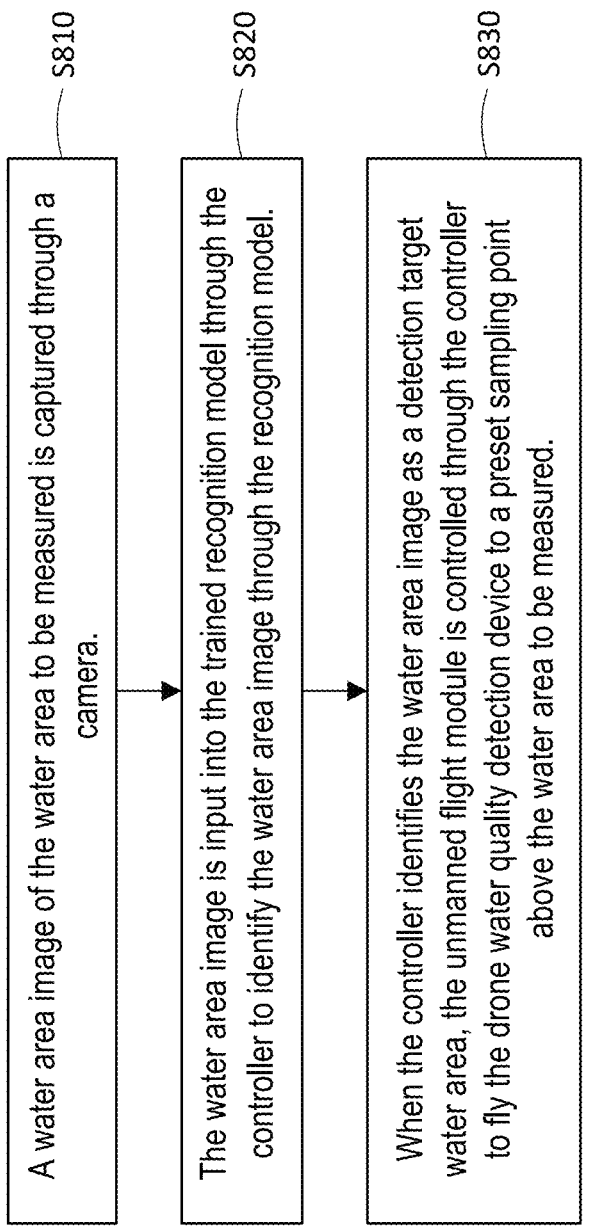

S810

A water area image of the water area to be measured is captured through a camera.

S820

The water area image is input into the trained recognition model through the controller to identify the water area image through the recognition model.

S830

When the controller identifies the water area image as a detection target water area, the unmanned flight module is controlled through the controller to fly the drone water quality detection device to a preset sampling point above the water area to be measured.

FIG. 8

DRONE WATER QUALITY DETECTION DEVICE AND DRONE WATER QUALITY DETECTION METHOD

BACKGROUND

Technical Field

The disclosure relates to a detection device, and in particular relates to a drone water quality detection device and a drone water quality detection method.

Description of Related Art

As the issue of an aging workforce becomes increasingly severe, the lack of manpower for the management and monitoring of aquaculture has become one of the important issues in this field. Due to the lack of digital management in traditional aquaculture, even the installation of stationary monitoring equipment cannot satisfy the requirements of water quality management and monitoring. Furthermore, traditional aquaculture has issues with easily damaged equipment, difficult maintenance, and high investment costs.

SUMMARY

A drone water quality detection device and a drone water quality detection method, which may realize effective water quality detection, are provided in the disclosure.

The drone water quality detection device of the disclosure includes an unmanned flight module, a reeling module, a controller, and a water quality analyzer. The controller is coupled to the unmanned flight module and the reeling module, and is configured to control the unmanned flying module and the reeling module. The water quality analyzer is coupled to the controller. The reeling module is connected to the water quality analyzer through a rope. When the drone water quality detection device flies above a water area to be measured, the controller controls the reeling module to release the water quality analyzer into the water area to be measured. The water quality analyzer detects a pressure parameter at a current line to transmit the pressure parameter back to the controller. The controller controls the reeling module to retract and unwind a line according to the pressure parameter to adjust a depth of the water quality analyzer in the water area to be measured.

The drone water quality detection method of the disclosure includes the following operation. The unmanned flight module and the reeling module of the drone water quality detection device are controlled through the controller. When the drone water quality detection device flies above a water area to be measured, the reeling module is controlled through the controller to release the water quality analyzer into the water area to be measured. The reeling module is connected to the water quality analyzer through a rope. A pressure parameter at a current time is detected through the water quality analyzer to transmit the pressure parameter back to the controller. The reeling module is controlled to retract and unwind a line through the controller according to the pressure parameter to adjust a depth of the water quality analyzer in the water area to be measured.

Based on the above, the drone water quality detection device and the drone water quality detection method may release the water quality analyzer into the water area to be measured through the drone, and may effectively determine and adjust the depth of the water quality analyzer in the water to be measured through pressure sensing.

In order to make the above-mentioned features and advantages of the disclosure comprehensible, embodiments accompanied with drawings are described in detail below.

BRIEF DESCRIPTION OF THE DRAWINGS

FIG. 5 is a flowchart of a drone water quality detection method according to an embodiment of the disclosure.

FIG. 8 is a flowchart of water area identification according to an embodiment of the disclosure.

DETAILED DESCRIPTION OF DISCLOSED EMBODIMENTS

Figure 1:
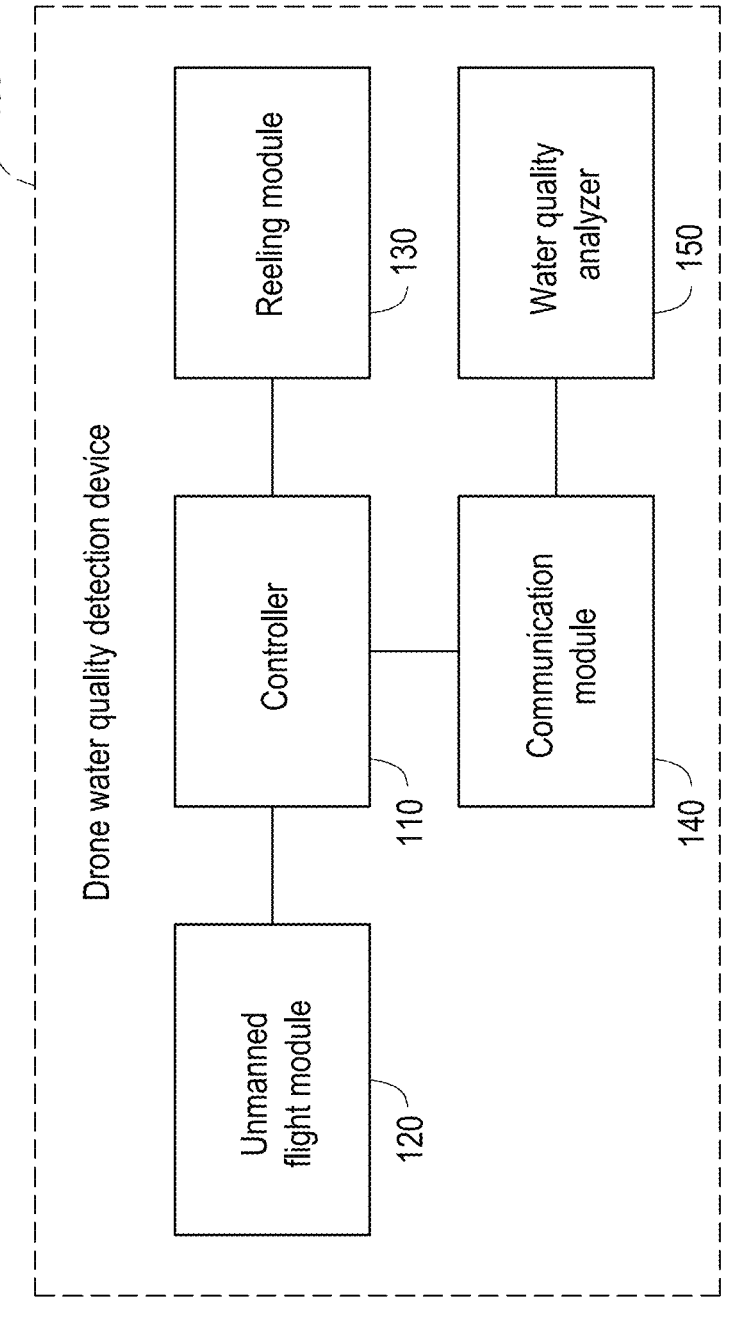
FIG. 1 is a circuit schematic diagram of a drone water quality detection device according to an embodiment of the disclosure.

In order to make the content of the disclosure easier to understand, the following specific embodiments are illustrated as examples of the actual implementation of the disclosure. In addition, wherever possible, elements/components/steps with the same reference numerals in the drawings and embodiments represent the same or similar parts.

FIG. 1 is a circuit schematic diagram of a drone water quality detection device according to an embodiment of the disclosure. Referring to FIG. 1, the drone water quality detection device 100 includes a controller 110, an unmanned flight module 120, a reeling module 130, a communication module 140, and a water quality analyzer 150. The controller 110 is coupled to the unmanned flight module 120, the reeling module 130, and the communication module 140. The communication module 140 is coupled to the water quality analyzer 150 through wireless communication. The reeling module 130 may be connected to the water quality analyzer 150 through the rope, and may release the water quality analyzer 150 to the outside of the drone water quality detection device 100.

In this embodiment, the controller 110 may be a control circuit such as a microcontroller unit (MCU), a digital signal processor (DSP), a system on a chip (SoC), or the like. In this embodiment, the unmanned flight module 120 may include relevant driving devices, motor devices, sensing devices, etc., for drones, which are configured to realize the flight functions of the drone. In this embodiment, the reeling module 130 is configured to store and release the rope. One end of the rope is fixed on the reel shaft of the reeling module 130, and the other end of the rope is fixed on the water quality analyzer 150. In this embodiment, the communication module 140 may include, for example, a Bluetooth communication interface, a 5G communication interface, RS232, RS485, a Modbus communication interface, a controller area network (CAN bus) and/or a Wi-Fi communication interface, etc., and the disclosure is not limited thereto.

Figure 2:
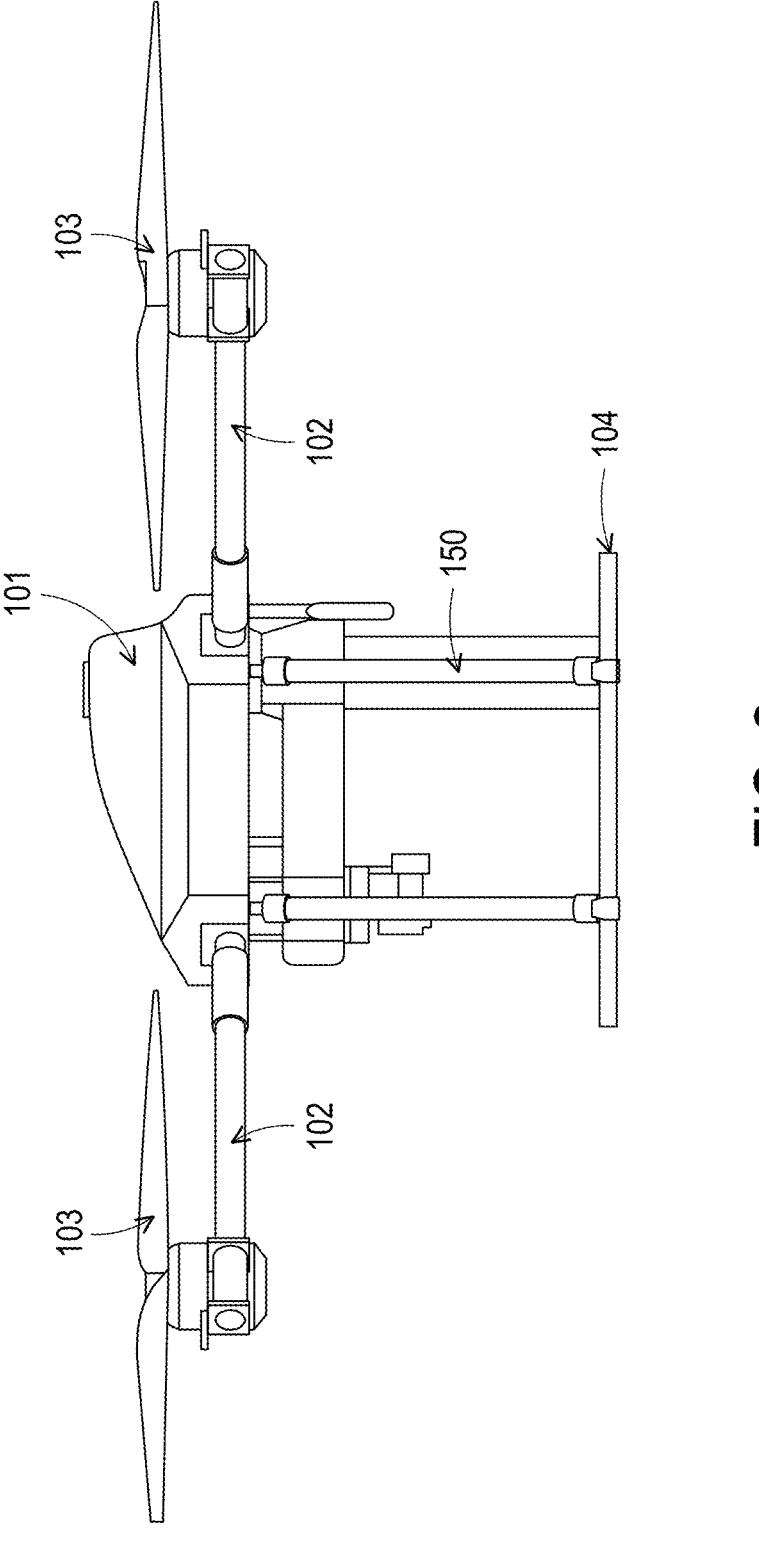
FIG. 2 is a structural schematic diagram of a drone according to an embodiment of the disclosure.

FIG. 2 is a structural schematic diagram of a drone according to an embodiment of the disclosure. Referring to FIG. 1 and FIG. 2, the drone water quality detection device 100 may be an unmanned flight vehicle. The drone water quality detection device 100 may also include a device body 101, a wing bracket 102, a propeller 103, and a landing bracket 104. The controller 110, the unmanned flight module 120, the reeling module 130, and the communication module 140 may be disposed in the device body 101. The water quality analyzer 150 may be partially stored in the device body 101. When the drone water quality detection device 100 releases the water quality analyzer 150, the reeling module 130 may hold the water quality analyzer 150 through the rope, and the water quality analyzer 150 may be detached from the device body 101.

Figure 3:
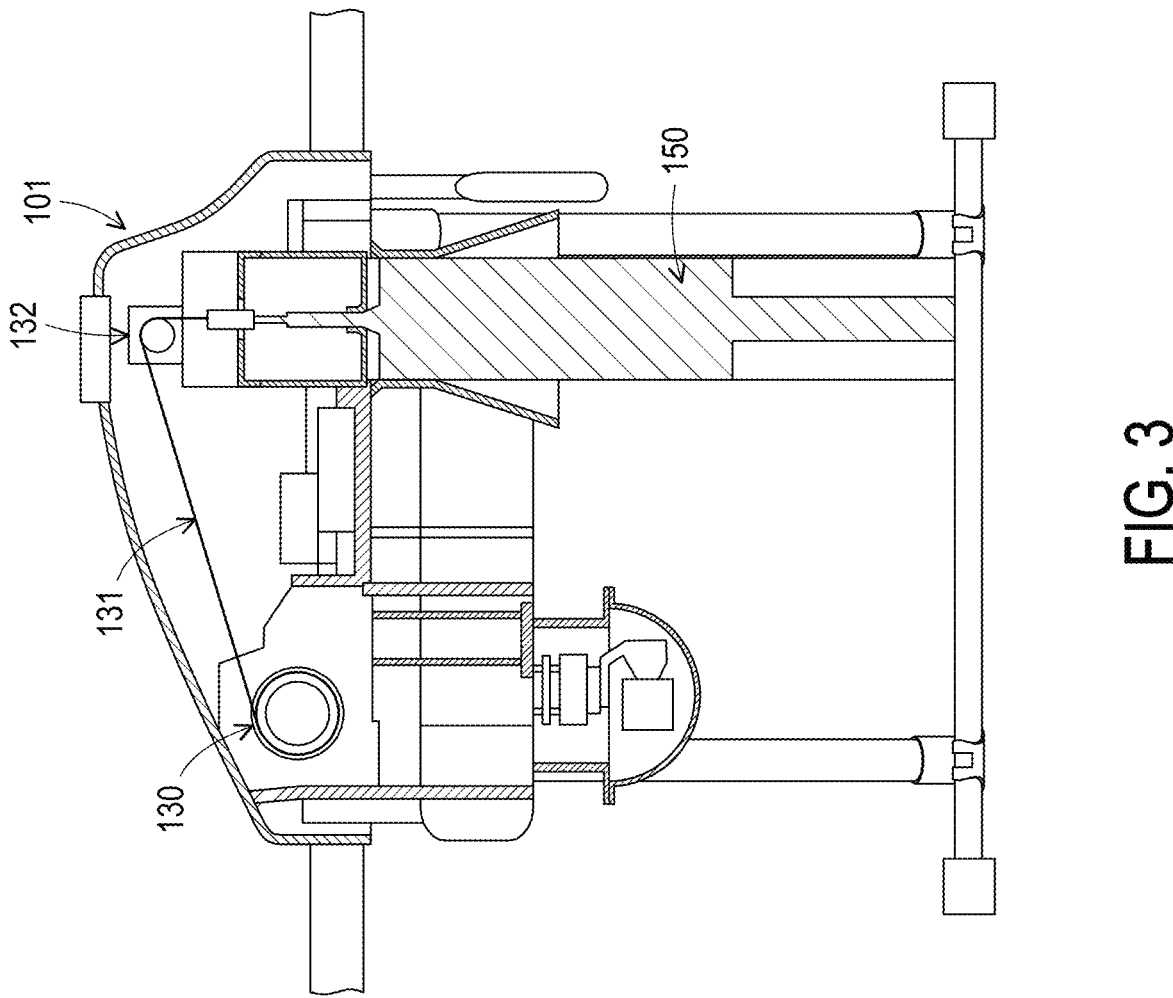
FIG. 3 is a perspective schematic diagram of a drone according to an embodiment of the disclosure.

FIG. 3 is a perspective schematic diagram of a drone according to an embodiment of the disclosure. Referring to FIG. 1 to FIG. 3, in this embodiment, the reeling module 130 may be disposed on one side of the device body 101, and the water quality analyzer 150 may be stored on the other side of the device body 101. The rope 131 of the reeling module 130 may perform retracting and unwinding operations in a vertical direction through the cooperation with the pulley set 132, and the rope 131 may be connected to the water quality analyzer 150. When the drone water quality detection device 100 releases the water quality analyzer 150, the reeling module 130 may hold the water quality analyzer 150 through the rope 131 and release the water quality analyzer 150 in a vertical direction. In one embodiment, the length of the rope 131 may be, for example, 30 meters, but the disclosure is not limited thereto.

Figure 4:
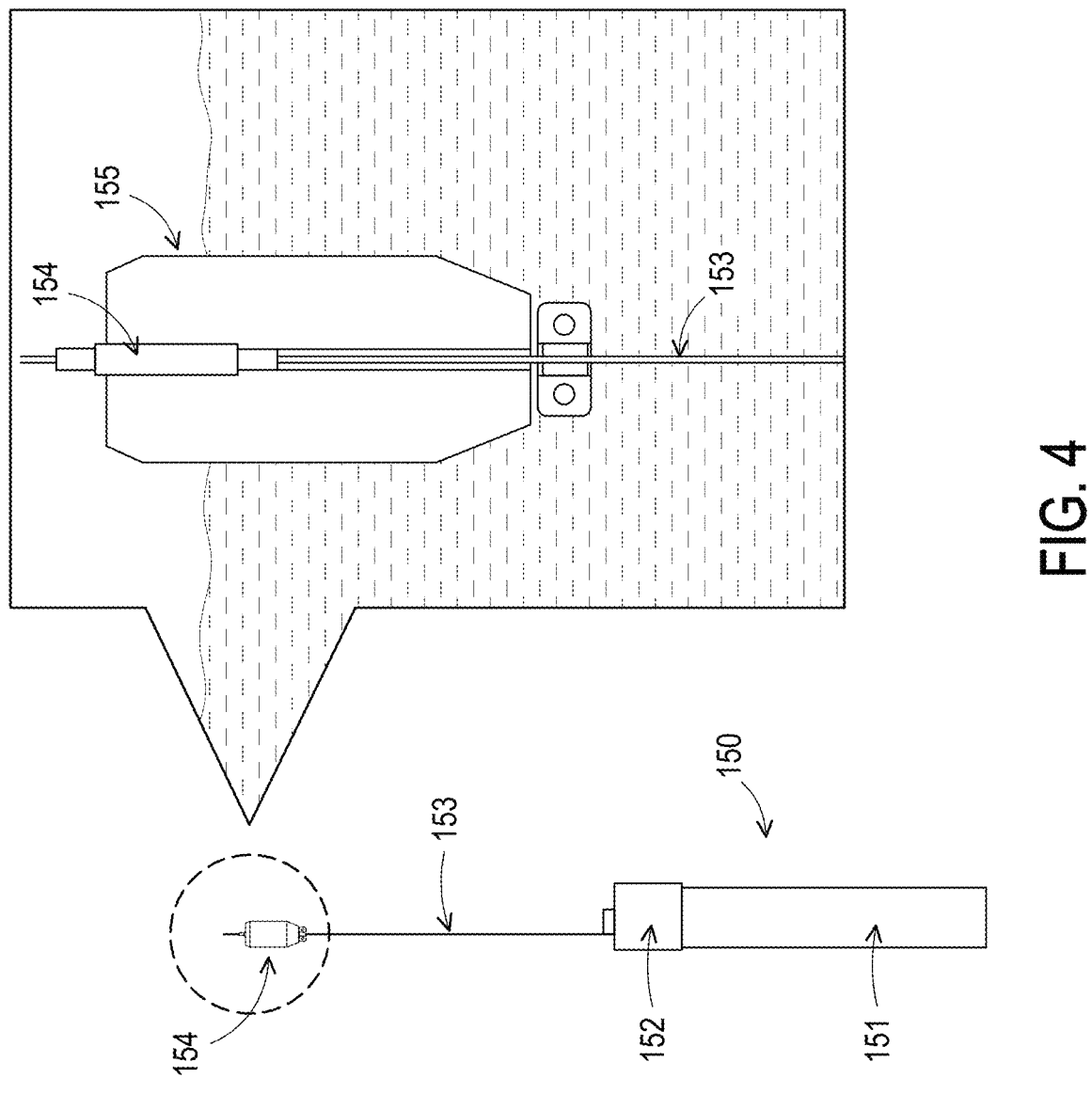
FIG. 4 is a structural schematic diagram of a water quality analyzer according to an embodiment of the disclosure.

FIG. 4 is a structural schematic diagram of a water quality analyzer according to an embodiment of the disclosure. Referring to FIG. 1 to FIG. 4, the water quality analyzer 150 may include a barrel 151 and a communication pod 152. The water quality analyzer 150 may also include a pressure sensor and a water quality sensor. The pressure sensor and the water quality sensor may be disposed in the barrel 151, and the disclosure is not limited thereto. The communication pod 152 may be connected to the communication module 154 through a cable 153. The communication module 154 is disposed in a floating ball 155. The communication module 154 may have an antenna and a communication interface, and may communicate wirelessly with the controller 110 through the communication module 140. The pressure sensor may provide a pressure parameter, and the water quality sensor may provide water quality detection data. The communication module 154 may transmit the pressure parameter and the water quality detection data to the communication module 140 to transmit the pressure parameter and the water quality detection data to the controller 110.

Figure 6:
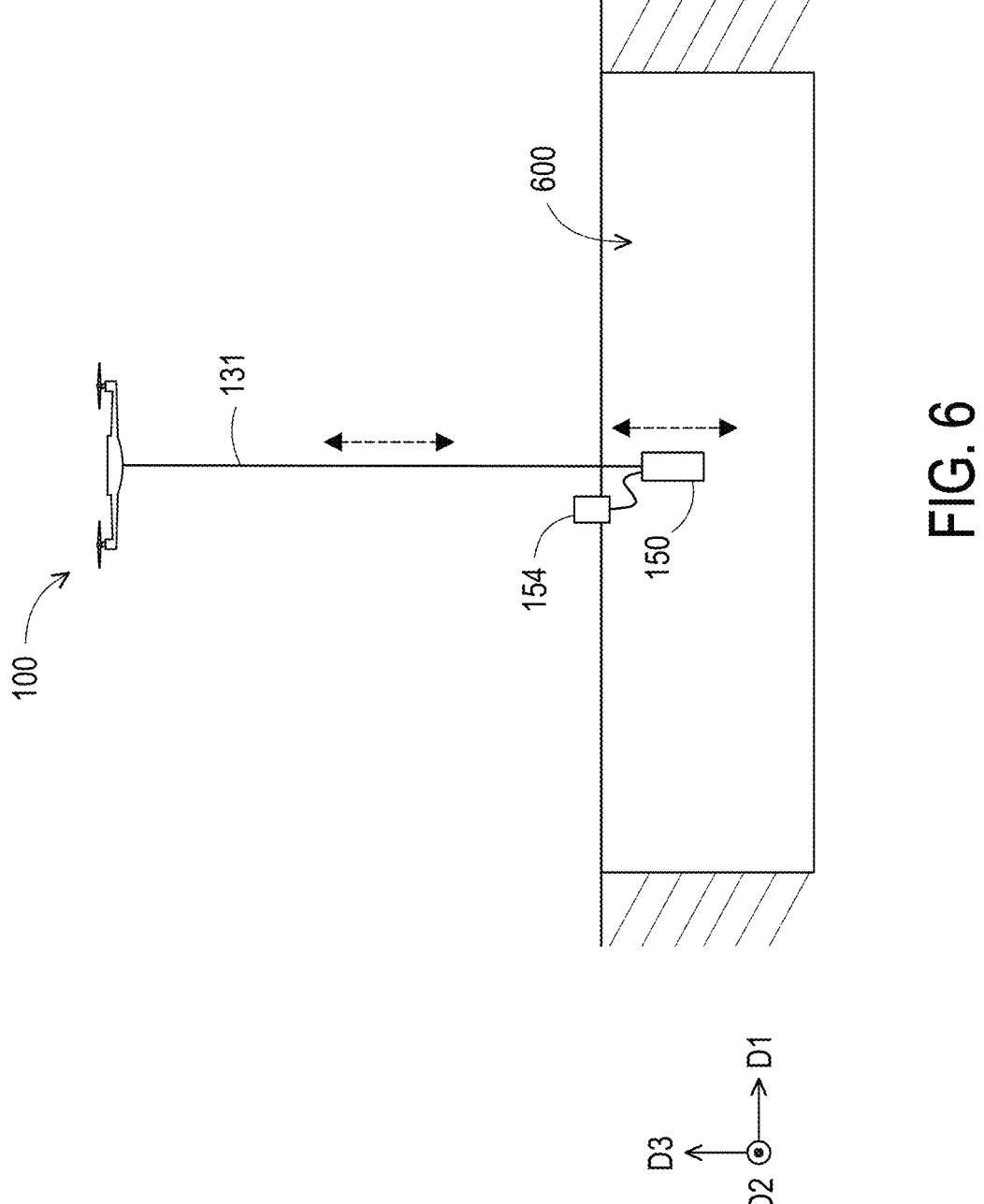
FIG. 6 is a schematic diagram of a water quality detection scenario according to an embodiment of the disclosure.

FIG. 5 is a flowchart of a drone water quality detection method according to an embodiment of the disclosure. FIG. 6 is a schematic diagram of a water quality detection scenario according to an embodiment of the disclosure. Referring to FIG. 1 to FIG. 6, the drone water quality detection device 100 may perform the following steps S510 to S540. In step S510, the controller 110 may control the unmanned flight module 120 and the reeling module 130 of the drone water quality detection device 100. In step S520, when the drone water quality detection device 100 flies above the water area to be measured 600, the controller 110 may control the reeling module 130 to release the water quality analyzer 150 into the water area to be measured 600. It should be noted that when the drone water quality detection device 100 flies above the water area to be measured 600, the drone water quality detection device 100 flies at a fixed preset height above the water area to be measured 600, and releases the water quality analyzer 150 into the water area to be measured 600 at a fixed preset height position. The reeling module 130 may be connected to the water quality analyzer 150 through the rope 131. In step S530, the water quality analyzer 150 may detect the pressure parameter at the current time to transmit the pressure parameter back to the controller 110. In step S540, the controller 110 may control the reeling module 130 to retract and unwind the line according to the pressure parameter to adjust the depth of the water quality analyzer 150 in the water area to be measured 600.

In this embodiment, the controller 110 may convert the pressure parameter into underwater depth data, and control the reeling module 130 to retract and unwind the line according to the underwater depth data. Moreover, when the controller 110 determines that the depth of the water quality analyzer 150 in the water area to be measured 600 reaches the preset depth, the controller 110 may stop the reeling module 130 from retracting and unwinding, and obtain the water quality detection data of the water area to be measured 600 through the water quality analyzer 150. In one embodiment, the water quality detection data may include at least one of water temperature, pH value, dissolved oxygen value, redox value, salinity, conductivity, and pond water algae color. Therefore, the drone water quality detection device 100 of this embodiment may effectively and automatically perform water quality detection.

Figure 7:
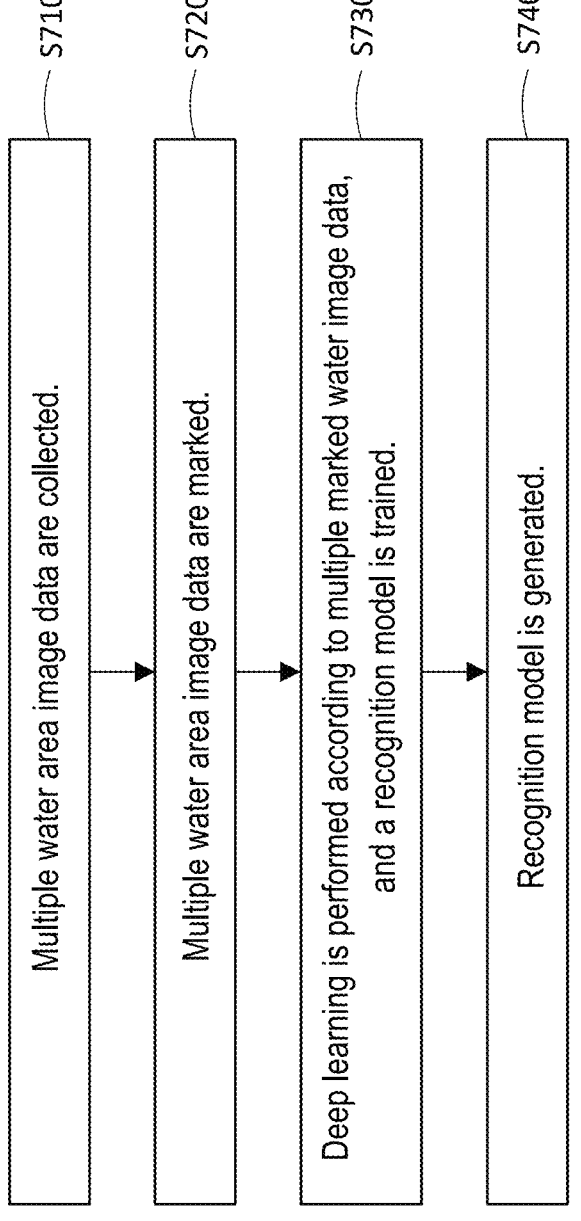
FIG. 7 is a flowchart of generating a recognition model according to an embodiment of the disclosure.

FIG. 7 is a flowchart of generating a recognition model according to an embodiment of the disclosure. FIG. 8 is a flowchart of water area identification according to an embodiment of the disclosure. Referring first to FIG. 1 and FIG. 7, in one embodiment, the controller 110 may control the unmanned flight module 120 to perform route inspection along a designated route, in which the water area to be measured may be located within the designated route. In this regard, the drone water quality detection device 100 may also pre-establish a recognition model for identifying the water area to be measured. The recognition model may be established according to the following process of steps S710 to S740. In step S710, the computing unit may collect multiple water area image data. The computing unit may be an external computer device, a cloud server, or a related computing platform. In step S720, the computing unit may mark multiple water area image data. In step S730, the computing unit may perform deep learning according to multiple marked water area image data and train a recognition model. In step S740, the computing unit may generate a recognition model. In this regard, the trained recognition model may be established in the storage unit of the controller 110.

Referring to FIG. 1 and FIG. 8, the drone water quality detection device 100 may perform the following steps S810 to S830 to realize automated water quality detection. The drone water quality detection device 100 may also include a camera or related image capture device. After the drone water quality detection device 100 is activated and is performing route inspection, in step S810, the drone water quality detection device 100 may capture a water area image of the water area to be measured through the camera. In step S820, the controller 110 may input the water area image into the trained recognition model to identify the water area image through the recognition model. In step S830, when the controller 110 identifies the water area image as the detection target water area, the controller 110 may control the unmanned flight module 120 to fly the drone water quality detection device 100 to a preset sampling point above the water area to be measured. In this way, the drone water quality detection device 100 may continue to perform the detection process of FIG. 7 to realize accurate and automated water quality detection functions.

To sum up, the drone water quality detection device and the drone water quality detection method of the disclosure may automatically cruise and automatically identify the water area to accurately arrive above the water area to be measured, and fly at a fixed preset height above the water area to be measured. Then, the drone water quality detection device may automatically release the water quality analyzer into the water area to be measured through the drone, and May automatically adjust the depth of the water quality analyzer in the water to be measured through pressure sensing. Therefore, the drone water quality detection device and the drone water quality detection method of the disclosure may realize accurate and automated water quality detection functions.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A drone water quality detection device, comprising:
an unmanned flight module;
a reeling module comprising a reel shaft for winding a rope and a pulley for guiding the rope;
a controller, coupled to the unmanned flight module and the reeling module, and configured to control the unmanned flying module and the reeling module; and
a water quality analyzer, coupled to the controller, wherein the reeling module is connected to the water quality analyzer through the rope,
wherein when the drone water quality detection device flies above a water area to be measured, the controller controls the reeling module to release the water quality analyzer into the water area to be measured, and the water quality analyzer detects a pressure parameter at a current time to transmit the pressure parameter back to the controller, wherein the controller controls the reeling module to retract and unwind a line according to the pressure parameter to adjust a depth of the water quality analyzer in the water area to be measured.

2. The drone water quality detection device according to claim 1, wherein the water quality analyzer comprises a pressure sensor, and the pressure sensor is configured to provide the pressure parameter, wherein the controller converts the pressure parameter into underwater depth data, and controls the reeling module to retract and unwind the line according to the underwater depth data.

3. The drone water quality detection device according to claim 2, wherein when the controller determines that the depth of the water quality analyzer in the water area to be measured reaches a preset depth, the controller stops the reeling module from retracting and unwinding the line, and obtains water quality detection data of the water area to be measured through the water quality analyzer.

4. The drone water quality detection device according to claim 3, wherein the water quality analyzer also comprises a communication pod, the communication pod is connected to a communication module through a cable, the communication module is disposed in a floating ball, wherein the communication module is configured to communicate wirelessly with the controller to transmit the pressure parameter and the water quality detection data to the controller.

5. The drone water quality detection device according to claim 3, wherein the water quality detection data comprises at least one of a water temperature, a pH value, a dissolved oxygen value, a redox value, a salinity, a conductivity, and a pond algae color.

6. The drone water quality detection device according to claim 1, wherein when the drone water quality detection device flies above the water area to be measured, the drone water quality detection device flies at a fixed preset height above the water area to be measured.

7. The drone water quality detection device according to claim 1, further comprising:
a camera, coupled to the controller, and configured to capture a water area image of the water area to be measured,
wherein the controller inputs the water area image into a recognition model that has been trained, to identify the water area image through the recognition model, and when the controller identifies the water area image as a detection target water area, the controller controls the unmanned flight module to fly the done water quality detection device to a preset sampling point above the water area to be measured.

8. The drone water quality detection device according to claim 7, wherein the controller controls the unmanned flight module to perform route inspection along a designated route, wherein the water area to be measured is located within the designated route.

9. A drone water quality detection method, comprising:
controlling an unmanned flight module and a reeling module of a drone water quality detection device are controlled through a controller;
controlling the reeling module through the controller to release a water quality analyzer into a water area to be measured when the drone water quality detection device flies above the water area to be measured, wherein the reeling module comprising a reel shaft for winding a rope and a pulley for guiding the rope, and wherein the reeling module is connected to the water quality analyzer through the rope;
detecting a pressure parameter at a current time through the water quality analyzer to transmit the pressure parameter back to the controller; and
controlling the reeling module to retract and unwind a line through the controller according to the pressure parameter to adjust a depth of the water quality analyzer in the water area to be measured.

10. The drone water quality detection method according to claim 9, wherein the water quality analyzer comprises a pressure sensor, and the pressure sensor is configured to provide the pressure parameter, wherein the controller converts the pressure parameter into underwater depth data, and controls the reeling module to retract and unwind the line according to the underwater depth data.

11. The drone water quality detection method according to claim 10, further comprising:
stopping the reeling module from retracting and unwinding the line through the controller, and obtaining water quality detection data of the water area to be measured through the water quality analyzer when the controller determines that the depth of the water quality analyzer in the water area to be measured reaches a preset depth.

12. The drone water quality detection method according to claim 11, wherein the water quality analyzer also comprises a communication pod, the communication pod is connected to a communication module through a cable, the communication module is disposed in a floating ball, wherein the communication module is configured to communicate wirelessly with the controller to transmit the pressure parameter and the water quality detection data to the controller.

13. The drone water quality detection method according to claim 11, wherein the water quality detection data comprises at least one of a water temperature, a pH value, a dissolved oxygen value, a redox value, a salinity, a conductivity, and a pond algae color.

14. The drone water quality detection method according to claim 9, wherein when the drone water quality detection device flies above the water area to be measured, the drone water quality detection device flies at a fixed preset height above the water area to be measured.

15. The drone water quality detection method according to claim 9, further comprising:

capturing a water area image of the water area to be measured through a camera;

inputting the water area image into a recognition model that has been trained through the controller, to identify the water area image through the recognition model; and controlling the unmanned flight module through the controller to fly the done water quality detection device to a preset sampling point above the water area to be measured when the controller identifies the water area image as a detection target water area.

16. The drone water quality detection method according to claim 15, wherein the controller controls the unmanned flight module to perform route inspection along a designated route, wherein the water area to be measured is located within the designated route.

* * * * *